United States Patent
Chang et al.

(10) Patent No.: US 7,894,791 B2
(45) Date of Patent: Feb. 22, 2011

(54) MULTI-CHANNEL MULTI-MEDIA INTEGRATED CIRCUIT AND METHOD THEREOF

(75) Inventors: Chao-Chung Chang, Jhongha (TW); Ming-Feng Yu, Tainan (TW); Ming-Jun Hsiao, Taichung (TW); Wei-Hao Yuan, Tainan (TW); Wei-Cheng Chang Chien, Kaohsiung (TW)

(73) Assignee: Alpha Imaging Technology Corporation, Hsin-Chu (TW)

( * ) Notice: Subject to any disclaimer, the term of this patent is extended or adjusted under 35 U.S.C. 154(b) by 762 days.

(21) Appl. No.: 11/836,931

(22) Filed: Aug. 10, 2007

(65) Prior Publication Data
US 2008/0091919 A1    Apr. 17, 2008

Related U.S. Application Data

(63) Continuation-in-part of application No. 11/581,118, filed on Oct. 13, 2006, now abandoned.

(51) Int. Cl.
*H04B 1/00* (2006.01)
*H04K 3/00* (2006.01)

(52) U.S. Cl. ............... 455/333; 455/556.1; 345/519; 712/27

(58) Field of Classification Search ............... 455/333, 455/556.1–556.2; 345/519–520; 712/27–29, 712/33
See application file for complete search history.

(56) References Cited

U.S. PATENT DOCUMENTS

2005/0210302 A1*  9/2005  Kato et al. ............... 713/320
2005/0265486 A1* 12/2005  Crawley .................. 375/326

FOREIGN PATENT DOCUMENTS

JP           2005-64581      *  3/2005

* cited by examiner

*Primary Examiner*—Lee Nguyen
(74) *Attorney, Agent, or Firm*—Tung & Associates

(57) ABSTRACT

The present invention discloses a multi-channel multi-media data processing method, comprising the steps of: providing a demodulator circuit and a multi-media processing circuit, the multi-media processing circuit including a DRAM; receiving multi-channel analog signals, and performing analog-to-digital conversion and demodulation on the signals by the demodulator circuit; storing the converted and demodulated multi-channel signals in the DRAM; and reading the signals of at least one channel from the DRAM.

13 Claims, 2 Drawing Sheets

MULTI-CHANNEL MULTI-MEDIA INTEGRATED CIRCUIT AND METHOD THEREOF

RELATED APPLICATIONS

The present invention is a continuation-in-part of U.S. Ser. No. 11/581,118 filed by the same applicant on Oct. 13, 2006 now abandoned.

FIELD OF THE INVENTION

The present invention relates to a multi-channel multi-media data integrated circuit, and in particular to a multi-channel multi-media data integrated circuit and a multi-channel multi-media data processing method which improves its memory access speed.

BACKGROUND OF THE INVENTION

FIG. 1 shows a block diagram of a conventional circuit capable of receiving and processing broadcasted multi-channel multi-media data. The circuit includes a stand-alone demodulation chip 110 and a stand-alone multi-media processor chip 120. The demodulation chip 110 demodulates received broadcasted multi-media data, and transmits the demodulated data to the multi-media processor chip 120 for further processing, to generate video signals and/or audio signals. These signals are displayed by a display 130 and a speaker 140. Such circuit may be used in, e.g., mobile phone, PDA (personal digital assistant), and mobile television. The broadcasted multi-media data may be, e.g., wireless Internet data, television signals, etc.

In this conventional structure, external RF (radio frequency) signals are received and processed by an RF tuner 101 for frequency-down conversion. The processed analog signals are transmitted to an ADC (analog-to-digital converter) 111 to be converted to digital signals, and further demodulated by an OFDM demodulator (Orthogonal Frequency Division Multiplexer demodulator) 112. Afterwards, under the control by a controller 113, the digital signals are stored in an SRAM (static random access memory) 118 according to the address generated by a data interleaving address generator 114. For error correction purpose, data should be stored and read from different directions; the data interleaving address generator 114 serves the function for determining the addresses to read and store data. For details of memory interleaving, please refer to U.S. Ser. No. 11/581,118 filed by the same applicant. The data stored in the SRAM 118 are subject to error correction, and stored back to the SRAM 118. Thereafter, under the control by the controller 113, the error-corrected data are transmitted to the multi-media processor chip 120 for further processing. The two chips 110 and 120 communicate with each other through an SPI (serial peripheral interface).

Typically, the multi-media processor chip 120 includes both a DRAM (dynamic random access memory) 128 and an SRAM 129; they communicate with other parts of the circuit via a memory control interface 127. A video decoder 122 reads data through the control interface 127, decodes the data, and outputs the data via a display controller 126, to display them on the display 130. In one instance, the display 130 is a liquid crystal display panel; however it can be any other display device. On the other hand, an audio decoder 124 also reads data through the control interface 127, decodes the data, and outputs the data to the speaker 140. For better visual effect, preferably, the chip 120 further includes a JPEG encoder/decoder 124 for compressing/decompressing video or graphic files; and an image processor 125 for processing display contrast, color, brightness, etc.

When the multi-media data are broadcasted in multiple channels, such as television signals, a user would like to switch among the multiple channels to select a preferred program. In order to display the content of a channel instantly and smoothly without any perceivable delay as the user switch to that channel, the data broadcasted through channels that are not presently being watched by the user, e.g. the previous and next channels or even more, are also downloaded, stored, and error-corrected, so that the data can be ready to display as the user switch to that channel.

In the above-mentioned conventional circuit structure, data in every channel that are received have to be subject to complete error correction in the demodulation chip 110, and then transmitted to the multi-media processor chip 120. However, the two chips 110 and 120 communicate with each other in a serial manner, i.e., with a narrow bandwidth; thus, the overall processing speed is not optimum. In addition, of all channels of data stored in the SRAM 118, only one channel is useful. Due to cost concern, the capacity of the SRAM 118 has a limitation. In other words, because of the limited capacity of the SRAM 118, the number of channels allowed to be stored in the SRAM 118 is also limited; thus, when a user arbitrarily switches to a randomly selected channel, delay is unavoidable.

In view of the foregoing, the present invention proposes a multi-channel multi-media integrated circuit to overcome the drawbacks in the prior art.

SUMMARY OF THE INVENTION

A first objective of the present invention is to provide a multi-channel multi-media integrated circuit which improves its memory access speed during processing multi-channel data, so that there is no delay when a user arbitrarily switches to a randomly selected channel.

A second objective of the present invention is to provide a multi-channel multi-media integrated circuit capable of displaying programs of more than one channel on a display.

A third objective of the present invention is to provide a corresponding method.

To achieve the foregoing objectives, in one aspect, the present invention discloses a multi-channel multi-media data integrated circuit coupled to a radio frequency (RF) tuner which receives multiple channels of RF multi-media data, the integrated circuit comprising: an analog to digital converter coupled to the RF tuner for converting the RF multi-media data to digital data; a demodulator coupled to the analog to digital converter for demodulating the converted data; a controller for controlling the storage and processing of the demodulated data; and a dynamic random access memory (DRAM) for storing the demodulated data of multiple channels, wherein the multi-channel multi-media data integrated circuit serves both demodulation and multi-media data processing functions.

In another aspect, the present invention discloses a multi-channel multi-media data processing method, comprising the steps of: providing a demodulator circuit and a multi-media processing circuit, the multi-media processing circuit including a DRAM; receiving multi-channel analog signals, and performing analog-to-digital conversion and demodulation on the signals by the demodulator circuit; storing the converted and demodulated multi-channel signals in the DRAM; and reading the signals of at least one channel from the DRAM.

For better understanding the objectives, characteristics, and effects of the present invention, the present invention will be described below in detail by illustrative embodiments with reference to the attached drawings.

DETAILED DESCRIPTION OF THE PREFERRED EMBODIMENT

Figure 1:
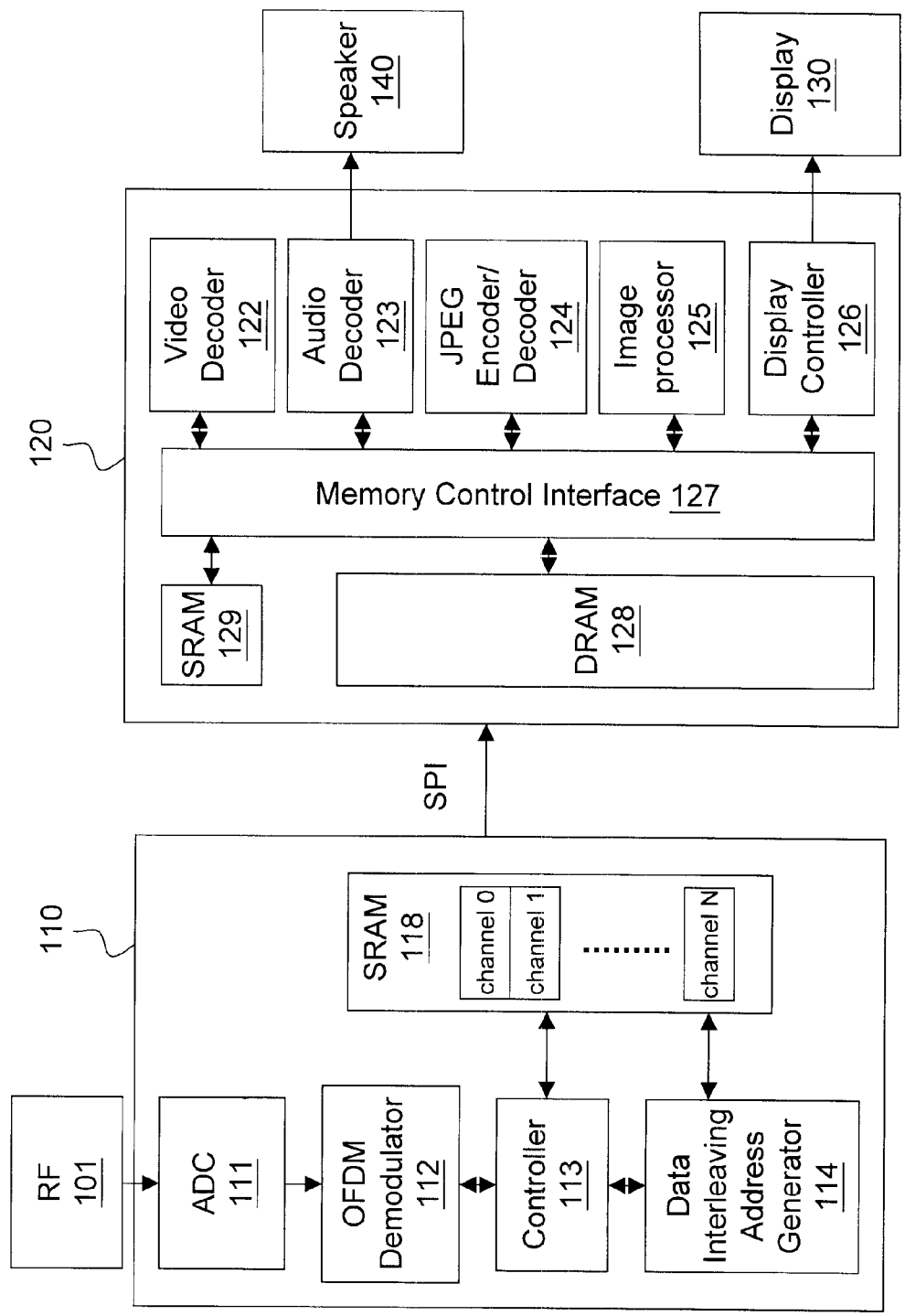
FIG. 1 schematically shows a conventional circuit capable of receiving and processing broadcasted multi-media data.
Figure 2:
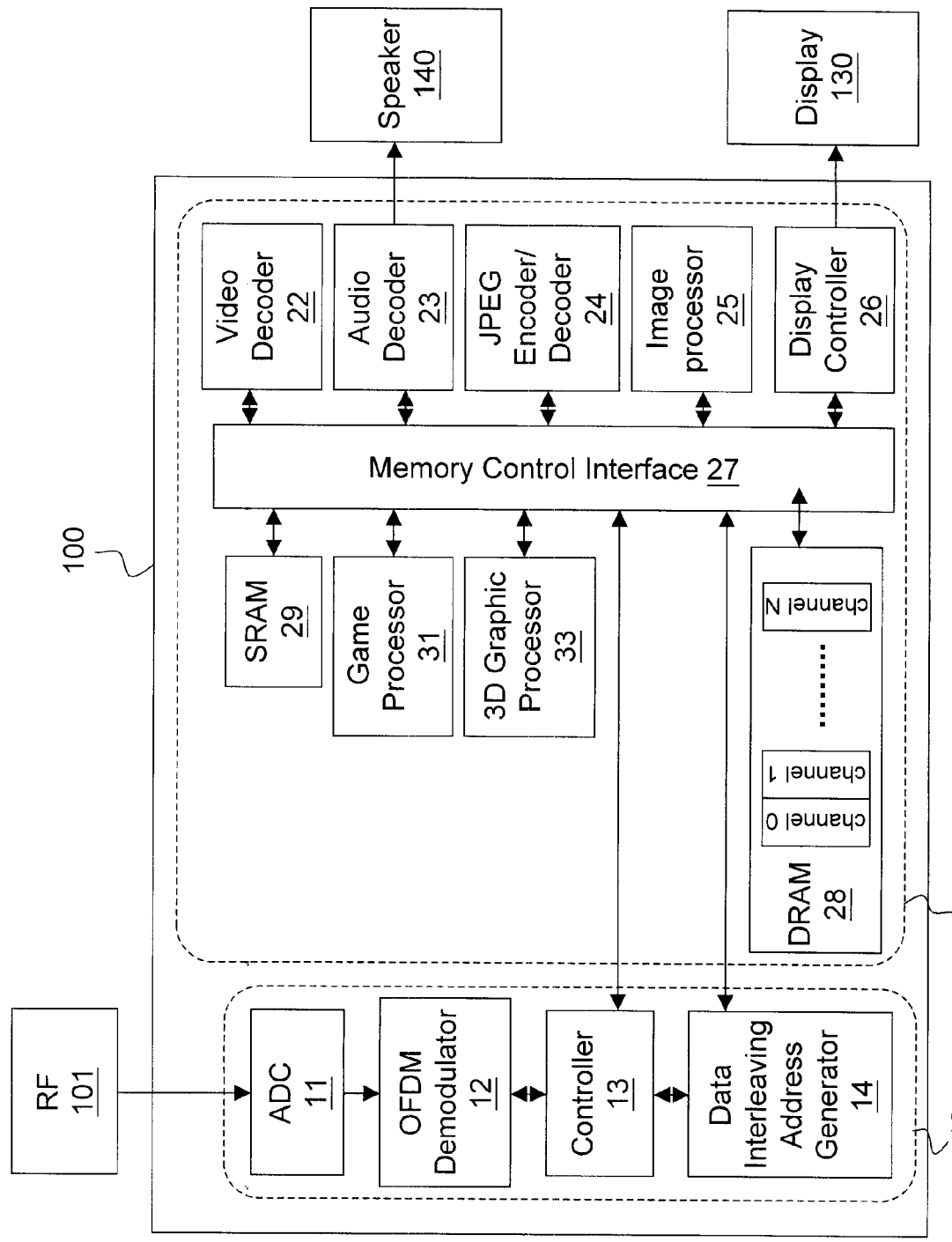
FIG. 2 schematically shows the hardware circuit structure of a preferred embodiment according to the present invention.

FIG. 2 schematically shows a preferred embodiment according to the present invention. In one embodiment, the circuits 11, 12, 13 and 14 form a demodulator circuit 10, while the other circuits form a multi-media processor circuit 20. In this embodiment, all circuits except: the RF tuner 101 are integrated in one integrated circuit chip 100. Thus, the SRAM (118) dedicated to the demodulator chip in the prior art can be omitted, and the circuits 11, 12, 13 and 14 can access the memories (DRAM 28 and SRAM 29) via the same memory control interface 27. Moreover, in the structure according to this embodiment, the received multi-channel data can be directly stored in the DRAM 28, by faster parallel transmission instead of slower serial transmission. In addition, under the same area and cost, the capacity of DRAM is much larger than SRAM, so the capacity of DRAM 28 is capable of storing much more channels of data than prior art. The present invention can store about 3-10 times of data as that in prior art.

In the embodiment of FIG. 2, the RF tuner 101 receives and processes multiple channels of external RF signals for frequency-down conversion. The processed analog signals are transmitted to an ADC 11 to be converted to digital signals, and further demodulated by an OFDM demodulator 12. Afterwards, under the control by a controller 13, the digital signals are directly stored in the channel areas of DRAM 28, to be subject to error correction. The channel areas do not have to one-to-one correspond to the external channels; external signals of multiple channels can be dynamically stored in any ones of the channel areas.

Because the memory capacity is enlarged in comparison to prior art, delay less likely occurs when a user arbitrarily switches to a randomly selected channel. The overall processing speed of the circuit also increases. Moreover, since number of the channels to be stored increases, the present invention can provide multi-channel parallel processing functions that do not exist in prior art, such as: 1) concurrently displaying programs of multiple channels on a display, by divided screen sections of the same or different sizes; or 2) on the one hand, displaying a program of one channel on a display, while on the other hand, recording the program(s) broadcasted in one or more other channels. The recordation may be done by storing the data as-is in the DRAM, or by compressing the data into a file, or outputting the data to an external storage device such as a hard disk, a compact disk, a memory card, a flash disk, etc.

In the embodiment of FIG. 2, preferably, the circuit further includes a game processor 31 to provide interactive games to a user; a 3D (3-dimensional) graphic processor 33 for processing 3D graphics; and so on.

By comparing the present invention with prior art, it can be readily seen that the present invention saves hardware cost; improves data processing efficiency; and stores more channels of data that it is able to provide many more user-friendly functions.

The features, characteristics and effects of the present invention have been described with reference to its preferred embodiments, for illustrative purpose rather than limiting the scope of the invention. Various other substitutions and modifications will occur to those skilled in the art, without departing from the spirit of the present invention. For example, between two circuit blocks shown in the embodiments, one may insert a circuit device that does not substantially affect the primary function of the overall circuit; depending on the received broadcasted signals, the demodulator 12 is not necessarily an OFDM demodulator; the display can be any display device o-her than a liquid crystal display panel; the RF tuner 101 is not necessarily a stand-alone device, but may be integrated with other circuit blocks. Therefore, all such substitutions and modifications are intended to be embraced within the scope of the invention as defined in the appended claims.

What is claimed is:

1. A multi-channel multi-media data integrated circuit coupled to a radio frequency (RF) tuner which receives multiple channels of RF multi-media data, the integrated circuit comprising:
    an analog to digital converter coupled to the RF tuner for converting the RF multi-media data to digital data;
    a demodulator coupled to the analog to digital converter for demodulating the converted data;
    a controller for controlling the storage and processing of the demodulated data; and
    a multi-media processor circuit for processing the demodulated data to generate and transmit video signals and/or audio signals to an external device, the multi-media processor circuit including a dynamic random access memory (DRAM) for storing the demodulated data of multiple channels.

2. The multi-channel multi-media data integrated circuit as claimed in claim 1, further comprising a data interleaving address generator for determining the addresses to read and store data.

3. The multi-channel multi-media data integrated circuit as claimed in claim 1, further comprising a memory control interface coupled to the DRAM and the controller.

4. The multi-channel multi-media data integrated circuit as claimed in claim 3, further comprising an SRAM coupled to the memory control interface.

5. The multi-channel multi-media data integrated circuit as claimed in claim 3, further comprising one or more of the following circuits, coupled to the memory control interface: a video decoder, an audio decoder, a JPEG encoder/decoder, an image processor, a display controller, a game controller, and a 3D graphic processor.

6. The multi-channel multi-media data integrated circuit as claimed in claim 1, wherein the RF tuner is integrated in the multi-channel multi-media data integrated circuit.

7. A multi-channel multi-media data processing method, comprising the steps of:
    providing a demodulator circuit and a multi-media processing circuit, the multi-media processing circuit including a dynamic random access memory (DRAM);
    receiving multi-channel analog signals, and performing analog-to-digital conversion and demodulation on the signals by the demodulator circuit;
    storing the converted and demodulated multi-channel signals in the DRAM;

reading the signals of at least one channel from the DRAM; and processing the signals of at least one channel to generate and transmit video signals and/or audio signals to an external device, wherein intermediate data generated during the processing of the signals of at least one channel is stored in the DRAM.

8. The method as claimed in claim 7, further comprising: performing error correction on the converted multi-channel signals.

9. The method as claimed in claim 7, wherein the converted multi-channel signals are stored in the DRAM in a parallel manner.

10. The method as claimed in claim 7, which reads the signals of at least two channels from the DRAM, and the method further comprising: concurrently displaying the signals of at least two channels on one display.

11. The method as claimed in claim 10, wherein the signals of at least two channels are displayed by divided screen sections of the same or different sizes.

12. The method as claimed in claim 7, which reads the signals of at least two channels from the DRAM, and the method further comprising: displaying the signals of one of the at least two channels on a display, and recording the signals of another one of the at least two channels.

13. The method as claimed in claim 12, wherein the signals of another one of the at least two channels are recorded on an external storage device.

* * * * *